(12) United States Patent
Alderman

(10) Patent No.: US 6,974,059 B2
(45) Date of Patent: Dec. 13, 2005

(54) LOCK-ON MOTORCYCLE TANK BAG

(76) Inventor: Leslie K. Alderman, 67160 Airport Rd., St. Clairsville, OH (US) 43950

(*) Notice: Subject to any disclaimer, the term of this patent is extended or adjusted under 35 U.S.C. 154(b) by 226 days.

(21) Appl. No.: 10/457,516

(22) Filed: Jun. 10, 2003

(65) Prior Publication Data

US 2004/0031833 A1 Feb. 19, 2004

Related U.S. Application Data

(60) Provisional application No. 60/387,590, filed on Jun. 12, 2002.

(51) Int. Cl.[7] ............... B62J 9/00; B62J 7/02; E05B 73/00
(52) U.S. Cl. ............ 224/413; 224/441; 70/58
(58) Field of Search ............... 224/413, 441; 396/529, 531; 109/52; 70/58, 62, 232; 220/297

(56) References Cited

U.S. PATENT DOCUMENTS

| | | | | |
|---|---|---|---|---|
| 3,915,335 A | * | 10/1975 | Shanklin et al. | 220/303 |
| 4,305,266 A | * | 12/1981 | Lockwood | 70/58 |
| 6,644,073 B1 | * | 11/2003 | Gartside et al. | 70/169 |
| 6,872,054 B2 | * | 3/2005 | Pearce | 416/244 R |
| 2001/0000617 A1 | * | 5/2001 | Tracy | 248/154 |
| 2002/0023995 A1 | * | 2/2002 | Yoshida et al. | 248/425 |

* cited by examiner

*Primary Examiner*—Nathan J. Newhouse
*Assistant Examiner*—Justin M Larson

(57) ABSTRACT

A mounting system designed to mount a luggage piece to the gas tank of a motorcycle. It consists of two separate pieces. A ring includes a push-pin cylinder lock affixed perpendicular to the rings side, extending the locks retractable lock pin beyond the inner wall of the ring when actuated. Additionally, pins inserted through the wall of the ring protrude beyond the edge of the rings inner surface to the inside and provide the interface attachment point for the press fit collar that comprises the other half of the mount system. A similar diameter collar is affixed to the bottom of the luggage piece. This collar is of a diameter that provides for a press fit of the collar inside the lock ring. Slots are cut into the side of this collar for the purpose of engaging the pins protruding to the inside of the lock ring. An additional cut out in the side of the collar provides for insertion of the push-pin locks retractable lock pin. Once the collar is press fit inside the lock ring, actuation of the push-pin lock extends the retractable lock pin through the engagement hole in the collar, effectively locking the collar and lock ring together.

3 Claims, 3 Drawing Sheets

TOP VIEW

SIDE VIEW

TOP VIEW

SIDE VIEW

TOP VIEW

US 6,974,059 B2

LOCK-ON MOTORCYCLE TANK BAG

RELATED U.S. APPLICATION DATA

This is related to a continuation of Provisional application No. 60/387,590 filed: Jun. 12, 2002 under the title: Tank Locker Lock-On Motorcycle Tank Bag

BACKGROUND OF THE INVENTION

1. Field of the Invention

This invention relates generally to a luggage piece attached to the gas tank of a motorcycle.

2. Prior Art

Motorcycles have available to them luggage pieces designed specifically for various functions, capacities, utilization and attachment methods. There are certain style bags designed specifically to be strapped to the rear portion of the passenger seat; saddlebags designed to be affixed to the sides of a motorcycle using either straps or a hard-point frame; hard sided bags designed to be attached to a frame bolted to the motorcycle chassis framework. One of the most popular style luggage pieces is a bag designed to be attached to the top flat portion of a motorcycle gas tank. Various attachment methods involving straps or magnetic bases provide a means of affixing this tank bag luggage piece to the gas tank. For example, U.S. Pat. Nos. 6,305,590 B1-5,664,716-4,974,765-4,469,256-4,359,233-4,059,207 all show embodiments of inventions providing for various tank bag luggage piece attachment methods. Common among some of these prior art devices is a securing method utilizing a strap or strap system holding the tank bag in place on top of the tank. Another uses a suction cup attachment method. While these disclosed prior art devices provide an attachment method of the bag to the gas tank, they are not without certain limitations and problems. These typically fall within two areas. One having to do with the unauthorized or unhindered removal of the tank bag from the gas tank; the other having to do with the potential paint finish compromise resultant of the contact between either the straps holding the bag in position, or the bag or parts thereof in contact with the paint surface of the motorcycle gas tank. Herewith are three examples. In U.S. Pat. No. 4,974,765 a suction cup arrangement 3 is utilized as the attachment method of the container to the gas tank 9 surface. The possibility exists that load related forces generated during hard maneuvering or abrupt acceleration/deceleration applied to the suction cups anchoring the container may exceed the adhesion coefficient of the suction cups. This could potentially dislodge the container and create an unbalanced condition, or a hazard resultant of the container coming off of the motorcycle. No provision is available which would restrict theft or unauthorized removal of the container. In U.S. Pat. Nos. 4,359,233 and 4,059,207 both tank bags are secured to the gas tank using a strapping system with a combination of straps, buckles and Velcro. While certainly providing an adequate fastening method, they make no provision for being able to lock the bag to the tank in such manner as to prevent theft of the bag. The direct contact of the bag and its attachment system (straps) to the surface of the gas tank additionally allows the potential for paint surface compromise (scratching) of the gas tanks painted surface. It therefore becomes desirable to provide an attachment method that provides the ability to lock the bag in place on the motorcycle gas tank while eliminating any contact between the painted surface of the gas tank, the tank bag itself, or the system utilized in its attachment to the tank.

OBJECTIVES OF THE INVENTION

Accordingly, objectives of the lock-on motorcycle tank bag are:

to provide a method in which a luggage piece or bag can be attached to the gas tank of a motorcycle devoid of any manner of straps, securing cords, Velcro attachment pieces, suction cups, or magnets;

to provide a system incorporating a locking feature that would provide the ability to engage a lock in such manner as to effectively lock the luggage piece to the gas tank and require a key or releasing device for the removal of such, to provide a mount system that effectively eliminates any physical contact between the luggage piece or any of its components, and the surface of the motorcycle gas tank;

to provide a mount system and luggage piece available for a multiplicity of applications, easily installed with a minimum of needed tools, fittings, or hardware, and that requires no modification, adaptation, re-working, or alteration of the factory provided gas cap assembly, of the motorcycle, or the motorcycles fuel tank itself;

to provide a mount system that utilizes the existent factory provided mount holes in the fuel tank gas cap assembly mount flange.

Additional objectives and advantages of the invention will become apparent to all from a consideration of the drawings and ensuing descriptions.

BREIF SUMMARY OF THE INVENTION

The applicant has invented a mounting system designed to secure a luggage piece commonly known as a tank bag to the gas tank of a motorcycle. This attachment system is composed of two similar circular ring style pieces. One is the tank mount lock collar designed to bolt to the mount flange of the aviation style gas cap assembly found on various motorcycles. Incorporated in the side of this tank mounted lock collar is a barrel cylinder push-pin lock as well as three small pins inserted equidistant around the diameter that protrude to the inside of this lock collar. The tank bag luggage piece is affixed to a hard base plate which is incorporated inside the bags bottom. On the underside bottom of this base plate is attached a similar collar, the base mount engagement collar, designed to interface with the tank mounted lock collar bolted to the perimeter of the gas cap assembly. Slotted cutouts in the lip of this base mount engagement collar provide an interface engagement point for the three pins inserted to the inside of the tank mounted lock collar. Once the base mount engagement collar is inserted into the tank mounted lock collar, the bag is rotated slightly in a clockwise manner that engages the slotted cutouts of the base mounted engagement collar over the pins protruding to the inside of the tank mounted lock collar. Once seated against the pins at the furthest possible clockwise rotation point, engagement of the barrel push-pin lock interfaces a hole machined in the lip of the base mount engagement collar. This push-pin lock engagement now precludes the ability to turn the assembly in the counterclockwise manner necessary to disengage the two collars, thus, effectively locking the assembly together. The height of the tank mounted lock collar (⅞") acts as a spacer, holding the tank bags affixed base plate up and away from any contact with the gas tanks surface. These affixed collars now serve as both the interface lock point effectively locking the bag to the motorcycle, as well as the spacer needed to eliminate contact between the bag itself and the motorcycle gas tank surface.

BRIEF DESCRIPTION OF THE SEVERAL DRAWING VIEWS

FIG. 1 shows a side view of the tank mount lock collar with the inserted push-pin lock mount collar containing the barrel cylinder push-pin lock. This is the collar that bolts down around the mount flange of the motorcycle gas tank gas cap assembly and forms the base piece of the mount system.

FIG. 2 is a top view, looking down inside the tank mount lock collar. Visible are the attachment holes drilled in a pattern specific to the mount application through which the bolts that affix this piece to the gas cap assembly flange would be inserted. Visible as well are the three inserted latch pins, located at the 12, 6, and 9 position, along with the push-pin lock mount collar and the barrel cylinder push pin lock (separated from the unit for purposes of this drawing only).

Figure 1:
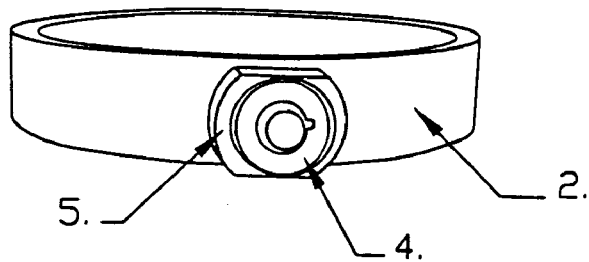
Figure 2:
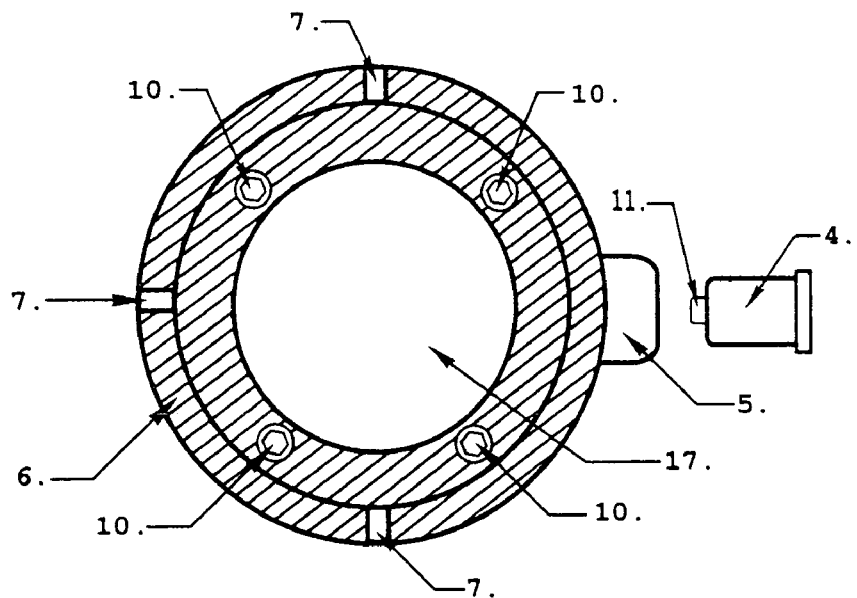

DRAWING REFERENCE NUMERALS 1. base mount engagement collar
2. tank mount lock collar
3. gas cap assembly
4. barrel cylinder push-pin lock
5. push-pin lock mount collar
6. tank mount lock collar flange
7. tank mount lock collar latch pins
8. base mount engagement collar push-pin lock engagement hole
9. lock collar latch pin cutout
10. tank mount lock collar flange attachment holes
11. barrel cylinder push-pin lock retractable lock pin
12. mounting holes
13. luggage piece (tank bag)
14. luggage piece base plate
15. mount bolts
16. motorcycle gas tank
17. gas cap access cutout

DETAILED DESCRIPTION OF THE INVENTION

Figure 3:
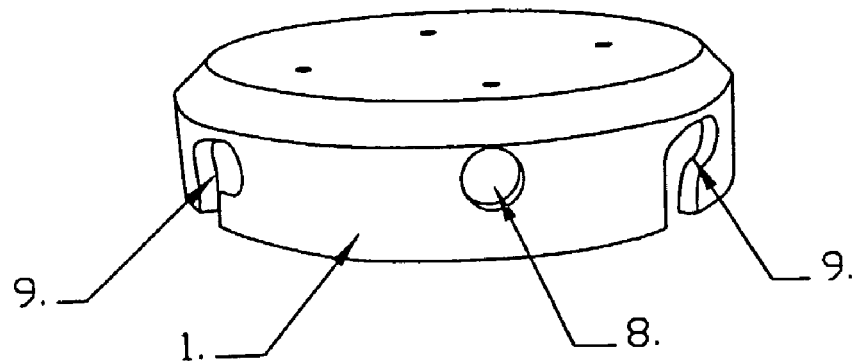
FIG. 3 is the base mount engagement collar showing the lock collar latch pin cutouts as well as the push-pin lock engagement hole. This is the part that would be affixed to the bottom of the tank bag luggage piece base plate, designed of such a diameter that it would interface (press fit) inside of the tank mount lock collar.
Figure 4:
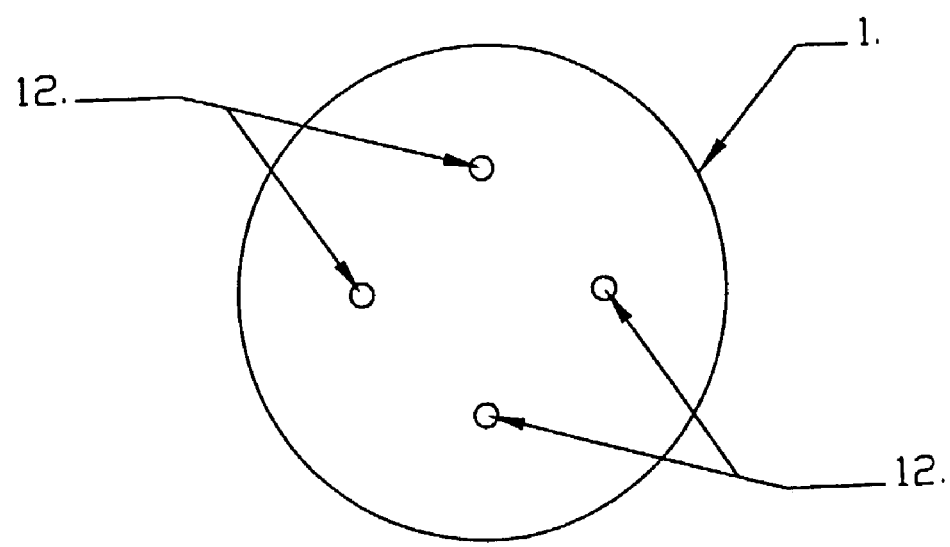
FIG. 4 is the top view of the base mount engagement collar showing the mounting holes through which the hardware used to attach this piece to the tank bag luggage piece base plate would be inserted.
Figure 5:
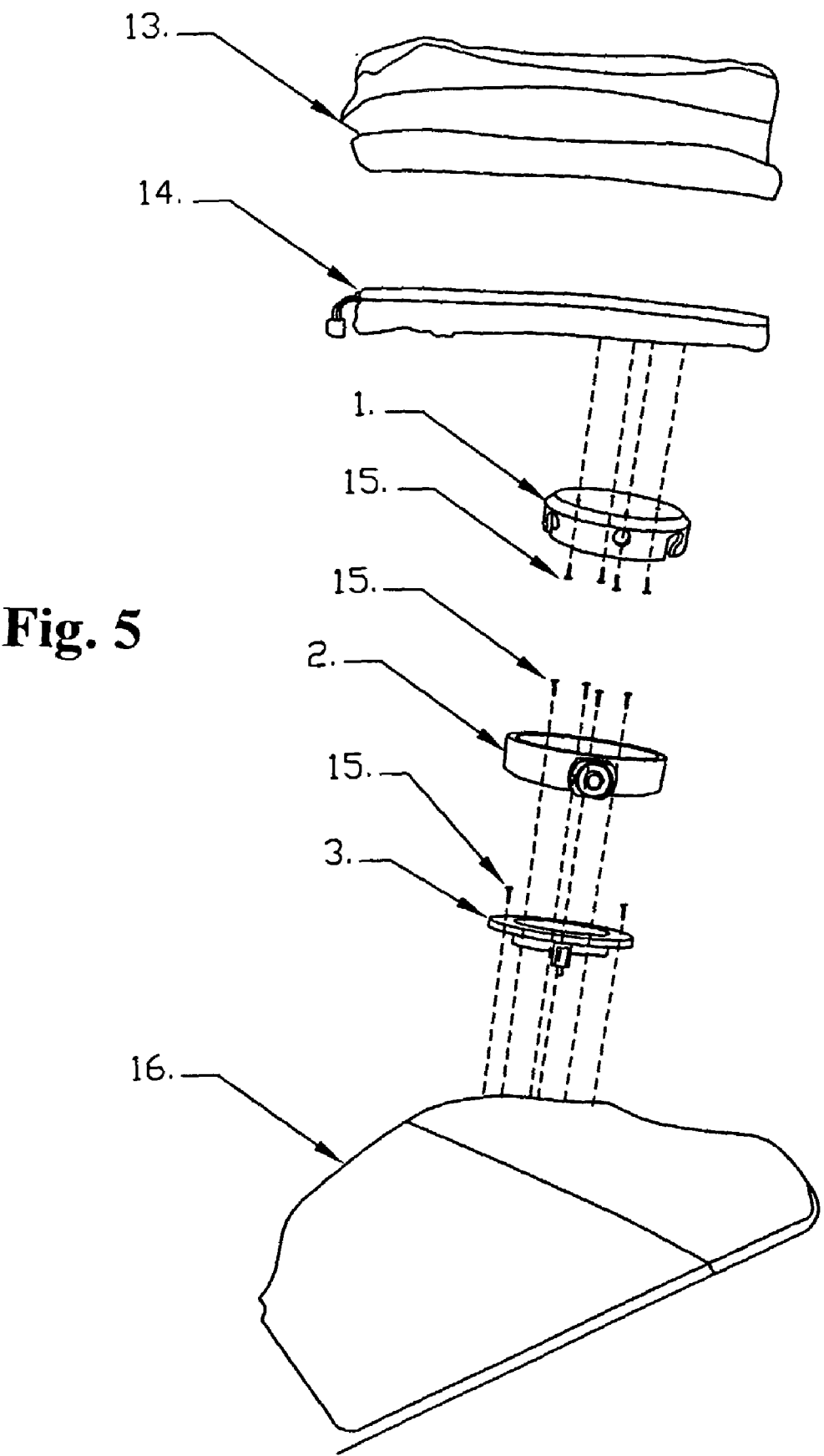
FIG. 5 is an exploded view of the embodiment of the invention showing the relative location of the various component pieces and how they interrelate with the tank bag luggage piece and the motorcycle gas tank.

In reference to the attendant drawing, FIG. 5 shows a schematic of the preferred embodiment of the invention and how it relates relative to the mount position on top of the motorcycle gas tank 16. The gas cap assembly 3 is located on the flat top surface of the motorcycle gas tank 16 and is affixed to this tank by means of mount bolts 15 inserted through an edge flange that forms the peripheral mount flange of this gas cap assembly 3. The tank mount lock collar 2 is a circular collar of a diameter approximately the same size as the gas cap assembly 3 to which it is attached using the mount bolts 15. The tank mount lock collar flange attachment holes 10 drilled through bottom of the tank mount lock collar 2 are drilled in a pattern that aligns with mount holes drilled into the peripheral mount flange of the gas cap assembly 3. This allows attachment of the tank mount lock collar 2 to the gas cap assembly 3 by using the mount bolts 15 threaded into the motorcycles factory provided mount holes on the motorcycle gas tank 16, thus eliminating any need to modify or alter the mount bolt hole pattern of either the motorcycle gas tank 16, or the gas cap assembly 3. The luggage piece 13 is mounted to, and incorporates in its base, a hard base plate 14, to which is attached the base mount engagement collar 1. The base mount engagement collar 1 is a circular ring style cap, the base of which is drilled with mounting holes 12 which allow insertion of the mounting bolts 15. This provides the means with which to affix the base mount engagement collar 1 to the underside of the luggage piece base plate 14. This base mount engagement collar 1 is of a diameter that allows it to be press fit into the tank mount lock collar 2. The FIG. 3 side view of the base mount engagement collar 1 shows the lock collar latch pin cut outs 9 which, when engaged with the tank mount lock collar 2, are designed to slide down over the tank mount lock collar latch pins 7 which protrude to the inside of the tank mount lock collar 2. These lock collar latch pin cutouts 9 are slotted in such manner as to allow a slight clockwise rotation of the base mount engagement collar 1 for the purpose of seating the tank mount lock collar latch pins 7 into a position beyond the vertical slotted opening of the lock collar latch pin cutout 9. This seating of the tank mount lock collar latch pins 7 in the farthest end of the horizontal slot portion of the lock collar latch pin cutout 9 eliminates the ability to separate the base mount engagement collar 1 from the tank mount lock collar 2, in effect, latching the collars together. Actuation of the barrel cylinder push-pin lock 4 affixed inside the push-pin lock mount collar 5 mounted perpendicularly into the side of the tank mount lock collar 2 precludes any ability to rotate the base mount engagement collar 1 as would be needed to unlock the two collars. The barrel cylinder push-pin lock retractable lock pin 11 protruding into the base mount engagement collar push-pin lock engagement hole 8 effectively eliminates any ability to rotate the base mount engagement collar in the counterclockwise direction as would be needed to become disengaged from the tank mount lock collar latch pins 7.

Unlocking the two collars first requires key actuation of the barrel cylinder push-pin lock 4 which would retract the barrel cylinder push-pin lock retractable lock pin 11 and withdraw it from the base mount collar push-pin lock engagement hole 8. Once this lock pin 11 is disengaged from the engagement hole 8, a counterclockwise rotation of the base mount engagement collar 1 would align the lock collar latch pin cutouts 9 in a position allowing the vertical movement of the base mount engagement collar 1 necessary to effectively disengage the collar 1 from the tank mount lock collar latch pins 7, thus, allowing separation of the two collars. Removal of the tank mount lock collar 2 from the motorcycle gas tank 16 is a matter of removing the mount bolts 15 that are inserted through the tank mount lock collar 2 and into the threaded attachment point used to connect the gas cap assembly 3 to the motorcycle gas tank 16. References made to clockwise and counterclockwise rotation of the attendant pieces are not intended to place a specific rotational direction limitation on the specific part to which it refers. Manufacturing, design, or application considerations may mandate a different rotational direction than specifics of this explanation may indicate, and are not to be construed as a limitation

I claim:

1. A motorcycle tank bag luggage piece mount system for the purpose of mounting a tank bag luggage piece to the gas tank of a motorcycle, comprised of two separate components that when fitted together, form the completed mount system, said system comprised of and including in combination:

A.) a circular lock ring manufactured in such manner as to be affixed to the mount flange edge of a motorcycle aviation style gas cap, said lock ring being manufactured from a group comprising plastic, aluminum, steel, titanium, carbon fiber; of a diameter or size as may be required of the application, and having:
  a.) a mount flange surface perpendicular to the lock ring edge of a diameter similar to the diameter of the application specific motorcycle gas cap assembly as well as a mount bolt hole pattern through which mount bolts would mate the mount flange surface of said lock ring to said gas cap assembly in the pattern and layout specific to the application;
  b.) a cut out, open area of the mount flange surface of said lock ring through which access to the motorcycle gas cap would be provided;
  c.) pins inserted through axial bores located in the side wall of said lock ring, protruding to the inside of said lock ring, for the purpose of providing an engagement interface between said lock ring and the slotted cutouts of the press fit collar that, when press fit inserted into said lock ring, forms the other half of this system
  d.) a barrel cylinder push-pin lock unit fitted perpendicularly into the side of said lock ring for the purpose of engaging the collar piece designed to press fit into said lock ring which comprises the second part of the mount system B.) a circular collar manufactured from a group including plastic, aluminum, steel, titanium, carbon fiber; in such manner as to be able to be attached to the bottom of a luggage piece, irrespective of the material, form, or composition of the luggage piece bottom and in a diameter and of a size as would provide the ability to be mated by press fit into the previously described ring that forms the other half of this mount system, and having:
  a.) slots cut along the longitudinal axis of the collars side, connected to vertical slots cut so that the collar may be pressed down vertically into the opening of said lock ring, thus engaging the pins affixed to and protruding to the inside of said lock ring;
  b.) and once so engaged be rotated in such direction as to laterally engage the pins along the longitudinal axis of the slot opening;
  c.) an opening of such diameter and location as to align with and accept insertion of the extended axial lock pin of the push-pin lock assembly affixed to and a part of said lock ring when said collar is rotated to the maximum extension of the longitudinal slots and the push-pin lock is so actuated; for the purpose of preventing the rotation of said collar and the attendant disengagement from the pins affixed to and protruding to the inside of said lock ring, thus preventing the vertical separation of said collar from said lock ring.

2. The motorcycle tank bag luggage piece mount system recited in claim 1 wherein the collar is affixed to something other than a luggage piece for the purpose of attaching the affixed piece to the motorcycle gas tank by press fitting said collar into said lock ring, thereby utilizing the both the attachment feature and locking ability of the apparatus.

3. The motorcycle tank bag luggage piece mount system recited in claim 1 wherein the tank mount lock ring is of a diameter and bolt hole drill pattern that provides for attachment to something other than a motorcycle gas tank for the purpose of attaching a luggage piece or other as may be affixed by press fitting said collar into said lock ring, thereby utilizing both the attachment feature and locking ability of the apparatus.

* * * * *